(12) United States Patent
Miller et al.

(10) Patent No.: US 9,996,434 B2
(45) Date of Patent: Jun. 12, 2018

(54) DATA MIRROR VOLUME VERIFICATION

(71) Applicant: International Business Machines Corporation, Armonk, NY (US)

(72) Inventors: Dash D. Miller, St. Louis Park, MN (US); Miguel A. Perez, Miami, FL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/337,783

(22) Filed: Oct. 28, 2016

(65) Prior Publication Data

US 2018/0121302 A1 May 3, 2018

(51) Int. Cl.
*G06F 11/00* (2006.01)
*G06F 11/20* (2006.01)
*G06F 3/06* (2006.01)

(52) U.S. Cl.
CPC .......... *G06F 11/2064* (2013.01); *G06F 3/065* (2013.01); *G06F 3/067* (2013.01); *G06F 3/0619* (2013.01); *G06F 3/0644* (2013.01); *G06F 3/0653* (2013.01); *G06F 11/2069* (2013.01)

(58) Field of Classification Search
CPC ............ G06F 11/2064; G06F 11/2069; G06F 11/2053; G06F 11/2056; G06F 11/1662; G06F 11/2082; G06F 3/0619; G06F 3/0644; G06F 3/065; G06F 3/0653; G06F 3/067; G06F 3/0614; G06F 3/0655; G06F 17/30575; G06F 17/30578; G06F 17/30581; G06F 2201/855
See application file for complete search history.

(56) References Cited

U.S. PATENT DOCUMENTS

| 6,389,511 B1 | 5/2002 | Kedem |
| 7,003,706 B2* | 2/2006 | McBride ............. G06F 11/2064 711/113 |
| 7,065,610 B1 | 6/2006 | Black |

(Continued)

OTHER PUBLICATIONS

"A method to mirror host new modified data with minimum storage space for remote copy suspension", ip.com, IP.com No. IPCOM000235428D, Feb. 27, 2014, 6 pages.

(Continued)

*Primary Examiner* — Bryce P Bonzo
*Assistant Examiner* — Anthony J Amoroso
(74) *Attorney, Agent, or Firm* — Kunzler, PC

(57) ABSTRACT

For volume verification, an apparatus is disclosed. The apparatus includes a data mirror that generates volume pairs of first and second volumes by mirroring track data from first volumes stored by a first device to second volumes as mirrored track data stored by a second device. The apparatus includes an activity monitor that monitors update activities for volume pairs and identifies volume pairs having substantial residual counts of update activities as indicated by a pre-determined residual count threshold. The apparatus includes a data verifier that selects one or more identified volume pairs for evaluation, compares the track data in the first volume to the mirrored track data in the second volume, and if a match discrepancy is determined, then re-copies the track data from the first volume to the second volume so as to correct and repair the mirrored track data in the second volume.

20 Claims, 6 Drawing Sheets

(56) References Cited

U.S. PATENT DOCUMENTS

| | | | |
|---|---|---|---|
| 7,434,091 B1 | 10/2008 | Karr | |
| 8,442,956 B2* | 5/2013 | Tofano | G06F 17/30489 |
| | | | 707/692 |
| 2010/0146348 A1* | 6/2010 | Zlotnick | G06F 11/2082 |
| | | | 714/54 |
| 2016/0320975 A1* | 11/2016 | Furuya | G06F 3/065 |

OTHER PUBLICATIONS

"Mirror Secondary Change Recording", ip.com, IP.com No. IPCOM0002438188D, Oct. 19, 2015, 3 pages.

* cited by examiner

DATA MIRROR VOLUME VERIFICATION

FIELD

The subject matter disclosed herein relates to a system, apparatus, and method for data storage backup and more particularly relates to handling data mirror volume verification.

BACKGROUND

In modern software mirroring solutions, bulk data is continuously copied from a primary volume to a secondary volume. Typically, conventional verification of the bulk copied data is deficient and fails to ensure that updates are accurate. This can cause unexpected hardware/software problems that result from lost or uncopied updates. In some cases, these discrepancies may not be reported for an extended period of time, e.g., until disaster recovery testing encounters data corruption on the secondary volumes. One reason why extensive verification is not done today is because typical methods of comparing bulk data across primary and secondary volumes causes performance drag on the data mirroring software. This performance drag can increase latency time of the mirror copy.

BRIEF SUMMARY

To overcome the deficiencies of modern software mirroring and recovery solutions, various implementations of the present disclosure provide for data mirror volume verification including intelligent extensive verification techniques that reduce impact on data mirror latency and account for in-flight or in-transit update activity. Further, various implementations of the present disclosure provide for logging data discrepancies and taking corrective actions to reduce exposure to data discrepancies.

An apparatus for handling data mirror volume verification is disclosed. In one embodiment, the apparatus includes a data mirror module that generates volume pairs of first and second volumes by mirroring track data from the first volumes stored by a first storage device at a first site to the second volumes as mirrored track data stored by a second storage device at a second site that is different than the first site. The apparatus includes an activity monitor module that monitors update activities for the volume pairs and identifies volume pairs having substantial residual counts of update activities as indicated by a pre-determined residual count threshold. The apparatus includes a data verification module that selects one or more of the identified volume pairs for evaluation, compares the track data in the first volume to the mirrored track data in the second volume, and if a match discrepancy is determined, then re-copies the track data from the first volume to the second volume so as to correct and repair the mirrored track data in the second volume.

An apparatus for handling data mirror volume verification is disclosed. In one embodiment, the apparatus includes a data mirror module that mirrors track data of a first volume from a first storage device at a first site to a second storage device at a second site. The track data from the first volume is mirrored as mirrored track data and stored in a second volume in the second storage device at the second site. The apparatus includes an activity monitor module that reads the track data from the first volume during mirroring and determines whether the track data being mirrored from the first volume is in-transit from the first storage device to the second storage device. If the track data being mirrored is in-transit, then the activity monitor module captures the track data being mirrored while in-transit from the first storage device to the second storage device. If the mirrored track data is not in-transit, then the activity monitor module reads the mirrored track data from the second volume that is stored in the second storage device at the second site. Further, the apparatus includes a data verification module that performs a verification task by comparing the track data from the first volume to the mirrored track data from the second volume. If the track data from the first volume corresponds to the mirrored track data from the second volume, then the data verification module identifies the verification task as successful. If the track data from the first volume fails to correspond to the mirrored track data from the second volume, then the data verification module identifies the verification task as unsuccessful and re-copies the track data from the first volume to the second volume so as to repair the mirrored track data in the second volume.

A method for handling data mirror volume verification is disclosed. In one embodiment, the method includes generating volume pairs of first and second volumes by mirroring track data from the first volumes stored by a first storage device at a first site to the second volumes as mirrored track data stored by a second storage device at a second site that is different than the first site. The method includes monitoring update activities for the volume pairs and identifying volume pairs having substantial residual counts of update activities as indicated by a pre-determined residual count threshold. The method includes selecting one or more of the identified volume pairs for evaluation and comparing the track data in the first volume to the mirrored track data in the second volume. Further, if a match discrepancy is determined, then the method includes re-copying the track data from the first volume to the second volume so as to correct and repair the mirrored track data in the second volume.

A computer program product that performs the functions of the method is disclosed. For instance, in one embodiment, the computer program product includes a computer readable storage medium having program instructions embodied therewith, the program instructions readable/executable by a processor to cause the processor to generate volume pairs of first and second volumes by mirroring track data from the first volumes stored by a first storage device at a first site to the second volumes as mirrored track data stored by a second storage device at a second site that is different than the first site. The processor monitors update activities for the volume pairs and identifies volume pairs having substantial residual counts of update activities as indicated by a pre-determined residual count threshold. The processor selects one or more of the identified volume pairs for evaluation and compares the track data in the first volume to the mirrored track data in the second volume. Further, if a match discrepancy is determined, then the processor re-copies the track data from the first volume to the second volume so as to correct and repair the mirrored track data in the second volume.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
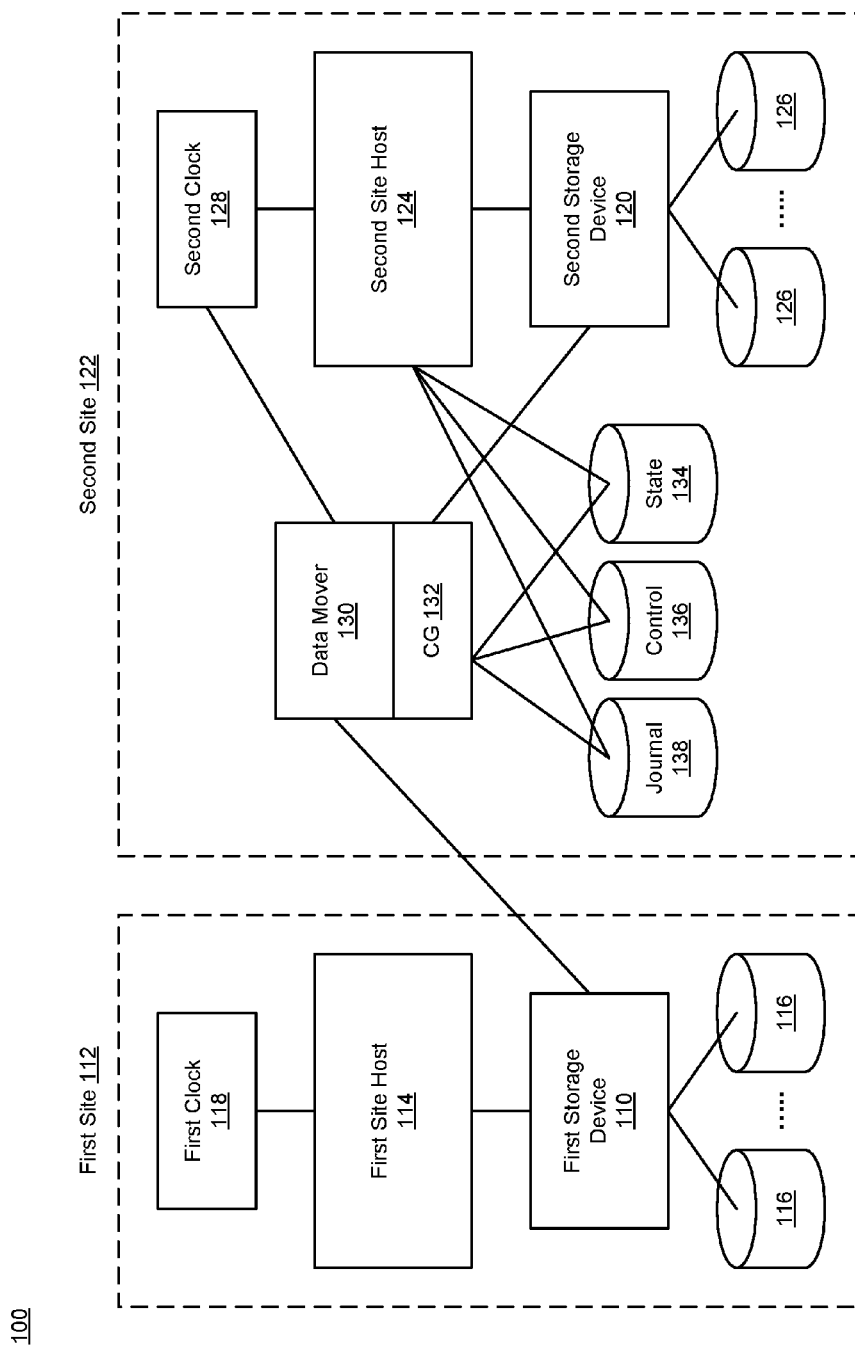
FIG. 1 is a schematic block diagram illustrating a computing environment for mirroring track data from a first storage device at a first site to a second storage device at a second site.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating a computing environment and related system 100 for mirroring data and information (e.g., track data and information) associated with write activities from a first storage device or apparatus 110 at a first site 112 to a second storage device or apparatus 120 at a second site 122. The second storage device 120 at the second site 122 may be separated from the first storage device 110 at the first site 112 by an extended distance, such as, e.g., a substantial number of miles.

The first storage device 110 may be referred to as a primary storage device, and the first site 112 may be referred to as a primary site. The first storage device 110 may also be referred to as a local storage device. In some cases, the first storage device 110 may be in communication with a first or primary site host device or system 114, and the first storage device 110 in combination with the first site host device 114 may be referred to as a primary system, application system, region 1 system, and/or a local system, where applications run and generate write activities for storage in one or more memory devices, such as, e.g., one or more first databases 116. In some implementations, each of the one or more first databases 116 may be referred to as first or primary volumes for storing data and information including track data associated with write activities. For instance, track data and information stored in the first or primary volumes 116 is associated with various write activities generated by the first storage device 110.

The first storage device 110 may utilize a first reference clock 118 as a first timing source or timer for timestamping various write activities generated and recorded by the first storage device 110. The first reference clock 118 may be referred to as a local reference clock that provides a current time of day (TOD) related to write activities of a particular storage session. Timestamps for write activities are provided in sequential order, and each sequential timestamp may include a next logical timestamp having a clock value associated with the storage control session. The first reference clock 118 may provide for time synchronization with a timestamp value that is based on a global time value.

Further, the second storage device 120 may be referred to as a secondary or auxiliary storage device, and the second site 122 may be referred to as a secondary or auxiliary site. The second storage device 120 may also be referred to as a remote storage device. In some cases, the second storage device 120 may be in communication with a second, secondary, or auxiliary site host device or system 124. The second storage device 120 in combination with the second site host device 124 may be referred to as a secondary system, auxiliary system, recovery system, region 2 system, and/or remote system that is used to take over the role of the first or primary system to run applications and/or generate write activities in various scenarios when the first or primary system is no longer available for use.

The data from the first or primary system is available for use on the second system via storage in one or more second, secondary, or auxiliary memory devices, such as, e.g., one or more second databases 126. This availability of stored data may be accomplished through mirroring data and information related to write activities using data replication and other data backup and recovery techniques as described herein. In some implementations, each of the one or more second databases 126 may be referred to as second, secondary, or auxiliary volumes for storing mirrored data and information including mirrored track data and information associated with various write activities generated by copying or mirroring track data and information from the first or primary volumes 116. For instance, mirrored track data and information stored in the second, secondary, or auxiliary volumes 126 may be associated with the various mirrored write activities copied or mirrored from the first storage device 110 to the second storage device 120. Thus, in some cases, matching first and second volumes 116, 126 may be referred to as volume pairs.

The second storage device 120 may utilize a second reference clock 128 as a second timing source or timer for checking and/or verifying timestamps of various write activities mirrored from the first storage device 110. The second reference clock 128 may be referred to as a remote reference clock that provides a current time of day (TOD) related to a particular storage control session associated with mirrored write activities. In some cases, when an invalid timestamp is identified, the second reference clock 128 may be used to provide a next logical timestamp as a replacement timestamp having a clock value of a last valid timestamp of the storage control session plus one time increment of the clock value of the last valid timestamp. Further, in some other cases, similar to the first reference clock 118, the second reference clock 128 may provide for time synchronization with a timestamp value that is based on a global time value.

The system 100 includes a data mover 130 that provides for data replication (i.e., remote copy implementation) over the extended distance between the first and second storage devices 110, 120 for continuity and disaster recovery of the data and information associated with write activities. The data mover 130 may be referred to as a system data mover (SDM) that communicates with the first and second storage devices 110, 120. The data mover or SDM 130 mirrors write activities from the first storage device 110 at the first site 112 to the second storage device 120 at the second site 122. The data mover or SDM 130 receives track data associated with the mirrored write activities from the first storage device 110 at the first site 112 and provides the mirrored track data associated with the mirrored write activities to the second storage device 120 at the second site 122.

The data mover 130 may communicate with the first storage device 110 so as to access track data associated with write activities that are stored in the first databases 116 or some other memory device that may serve as a cache, where a linked list of updates (e.g., various stored record sets of write activities) may be located before being read by the data mover 130. The updates to the first databases 116 may be stored in the first or primary volumes 116 and managed by a particular storage control session. The first storage device 110 may provide hardware bitmaps to the data mover 130 for tracking data and information that has not been sent or copied to the second storage device 120. The tracking data and information may be used for resynchronization, if data replication suspends.

The data mover 130 may communicate with the second storage device 110 so as to access mirrored track data related to mirrored write activities that are stored in the second databases 126 that are physical storage units where a collection of mirrored second volumes are located, e.g., at the second site. This collection of mirrored second volumes may be copies or mirrors of the first or primary volumes of the first storage device 110, or some subset thereof. Further, the second storage device 120 may be able to rebuild and/or run a production environment for data continuity, backup, and recovery in the event of a loss of production processing capabilities at the first site 112.

The data mover 130 may be coupled to the second reference clock 128, and the data mover 130 is able to retrieve timestamps having clock values related to a current time of day (TOD) associated with particular storage sessions. In some cases, as shown in FIG. 1, the data mover or SDM 130 is located and runs at the second site 122. In other cases, the data mover or SDM 130 may be located and may run at the first site 112.

In some cases, the data mover 130 records the mirrored write activities in a consistency group (CG) 132 in sequence by time order based on the timestamp of each mirrored write activity. Therefore, the consistency group 132 includes a record set of the mirrored write activities that are sequenced in sequential order based on the timestamp of each mirrored write activity. In reference to timestamps, maintaining update sequence for applications whose data is being copied in real time is important for applications that run dependent write activities and operations. For instance, if track data is copied out of time sequence, serious integrity exposures and/or discrepancies may inhibit recovery procedures from working properly. As such, the data mover 130 assists with ensuring consistency for write activity data associated with updates and mirrored data. When a record is written by an application to the first storage system 110, timestamps are attached to the data associated with write activities. The first storage device 110 keeps records together with timestamps in cache, and the data mover 130 reads the records from the cache, including the timestamp information for each write activity to ensure data consistency.

In reference to consistency groups (CG) 132, the data mover 130 holds or stores update write activities (as mirrored write activities) that were read from the first storage device 110 in memory buffers, and the data mover 130 orders these update write activities (or mirrored write activities) into the consistency groups (CGs) 132. In some cases, the consistency groups (CGs) 132 may include records having their order of update preserved based on the timestamp information to thereby maintain data consistency. This preservation of sequential order is important for dependent write activities and operations that are used, such as databases and logs. In some instances, the creation of CGs 132 may ensure that the data mover 130 applies the updates or mirrors to the second volumes with consistency for various types of track data.

As described herein, the data mover 130 communicates with the first storage device 110 for connectivity to the first volumes of data stored in the first databases 116, and the data mover 130 communicates with the second storage device 120 for connectivity to the second mirrored volumes of mirrored data stored in the second databases 126. When applications perform write activities and write to the first volumes, the data mover 130 manages the process of mirroring updates to the second mirrored volumes, and the data mover 130 ensures that updates to the second mirrored volumes are made in a same order in which they were made to the first volumes, maintaining sequence consistency. Further, the data mover 130 performs recovery processes, including applying remaining updates to form consistency groups CGs to the second storage device 120, relabeling second mirrored volumes and making them ready for use at the second site 122 (e.g., recovery site).

The data mover 130 may utilize a state data set 134, a control data set 136, and a journal data set 138. The state data set 134 serves as a table of contents for the storage control session. The state data set 134 may include a status of the storage control session and a status of related volumes that the storage control session is managing. The state data set 134 may also store session performance information. The control data set 136 may include consistent group information about the second mirrored volumes and journal data sets. The control data set 136 may also include information that is necessary for recovery operations. The journal data set 138 may include temporary user data that may have changed at the first volumes and read by the data mover 130. The data mover 130 may write data that forms a consistency group to the journal data set 138 to harden the data before the data mover 130 applies the data to the second mirrored volumes.

Figure 2:
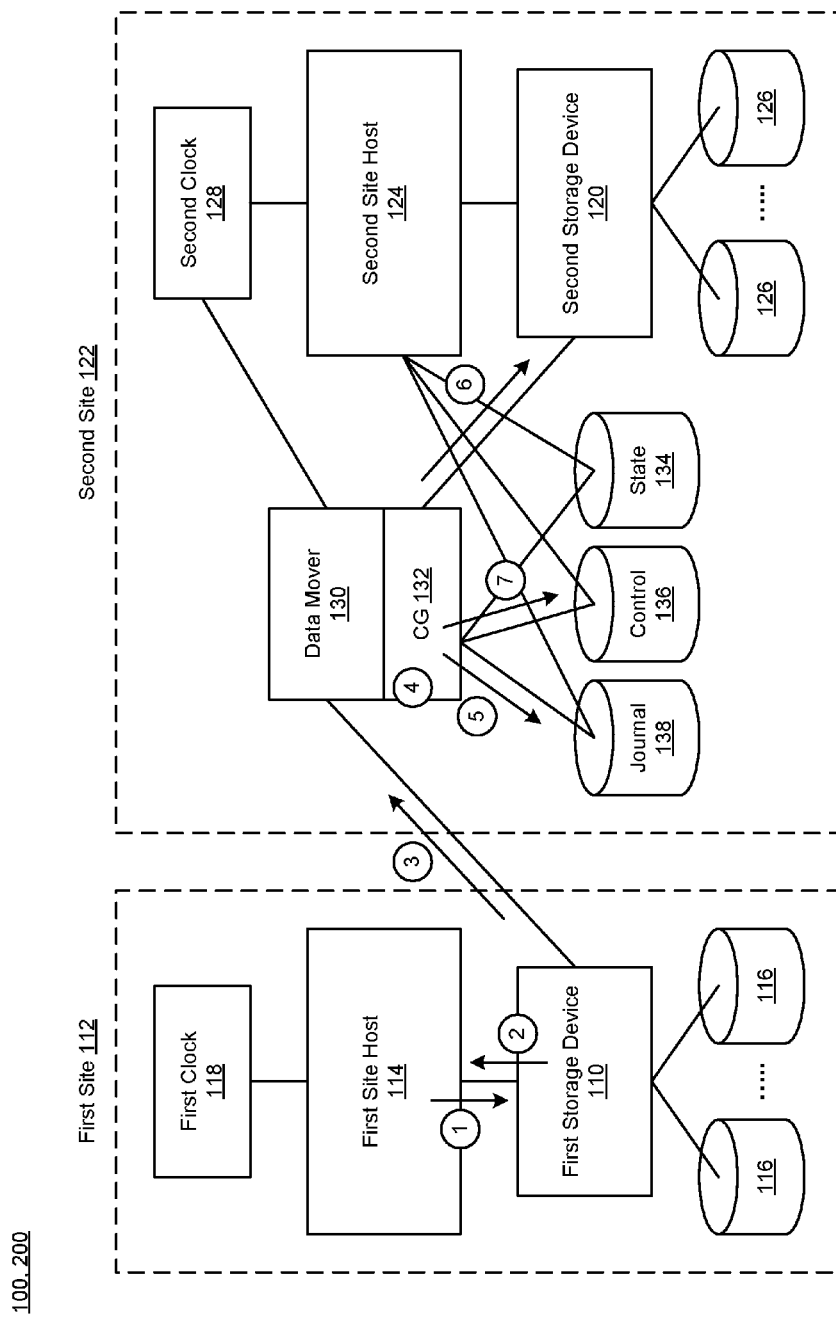
FIG. 2 is a schematic block diagram illustrating one embodiment of a data flow for mirroring track data between first and second storage devices.

FIG. 2 is a schematic block diagram illustrating one embodiment of a data flow 200 for mirroring track data associated with write activities in the computing system 100 between the first and second storage devices 110, 120.

In the process flow 200 of FIG. 2, in a first process (1), the first site host 114 writes to the first storage device 110. In a second process (2), the application write operation completion is signaled from the first storage device 110 to the first site host 114 when the data is written to the cache of the first storage device 110. After the application write I/O operation has completed, the updated data is mirrored asynchronously by the data mover 130 from the first storage device 110 to the second storage device 120. In a third process (3), the first storage device 110 groups the updates into record sets in the cache, and these groups are asynchronously offloaded from the cache of the first storage device 110 to the data mover 130 as track data. In a fourth process (4), the record sets from the first storage device 110 are processed into consistency groups (CGs) 132 by the data mover 130. The CG 132 includes record sets that have their sequential order of update preserved based on timestamps.

In a fifth process (5), when the CG 132 is formed, the data mover 130 stores the CG 132 in real storage buffers to the journal dataset 138. In a sixth process (6), after the CG 132 has been hardened on the journal dataset 138, the records are written to the second storage device 120. Those record sets may also be written from real storage buffers of the data mover 130. In some cases, because the track data may be in-flight or in-transit between the first and second sites 112, 122, the track data at the second site 124 stored by the second storage device 120 may be slightly less current than the track data at the first site 112 stored by the first storage device 110. In a seventh process (7), the control dataset 136 may be updated to reflect that record sets in the CG 132 have been written to the second storage device 120 and to reflect consistency timing of the volume pair.

Along with processes (1)-(7), the data mover 130 provides for intelligent extensive volume verification that will minimally impact data mirror latency and account for in-flight or in-transit activity. Further, the data mover 130 provides for logging and/or recording track data discrepancies, discontinuities, and/or corruption and take corrective actions to substantially reduce exposure thereto. For instance, the data mover 130 may perform various tasks to ensure data consistency between the first or primary volumes and the mirrored second volumes. Thus, as described in greater detail herein below, the data mover 130 may perform various tasks related to monitoring update activities for the volume pairs, identifying volume pairs having substantial residual counts of update activities as indicated by a pre-determined residual count threshold, and selecting one or more of the identified volume pairs for evaluation. Further, the data mover 130 may perform various tasks related to comparing the track data in the first volume to the mirrored track data in the second volume, and if a match discrepancy is determined, then the various tasks may further include re-copying the track data from the first volume to the second volume so as to correct and repair the mirrored track data in the second volume.

In accordance with the various implementations described herein, the data mover 130 may be configured for tasks and techniques related to data mirror high residual count extensive volume verification. For instance, tasks and techniques provided herein may be performed by data mirroring technology, such as, e.g., Extended Remote Copy or XRC, which refers mainframe computer technology for data replication.

Using XRC as an example, the data mover 130 may have its own address space that may be used to create low priority tasks on XRC LPARs mirroring data. LPAR refers to a Logical PARtition, which may represent a subset of a hardware resources that is partitioned into multiple logical partitions with each partition virtually hosting a separate operating system. On a pre-determined time interval (e.g., every hour), the data mover 130 may read a time interval's worth of XRC Write Pacing Monitor data to identify new volume pairs (of first and second volumes) that have high residual counts as indicated by an XRC high residual count threshold. In this instance, volume pairs with high residual counts may represent volumes processing large numbers of update activities and thus may have higher statistical chances of losing an update. For this reason, the data mover 130 may select these volume pairs for extensive verification to substantially reduce processing overhead. The data mover 130 may then perform extensive verification on each volume pair in parallel as independent low priority tasks, so that the processing completes as soon as possible while minimally impacting data mirror processing. If a discrepancy is found, the data mover 130 may then log an exception and further re-copy track data so that the update activities are not exposed to missing data on the secondary volumes.

Figure 3:
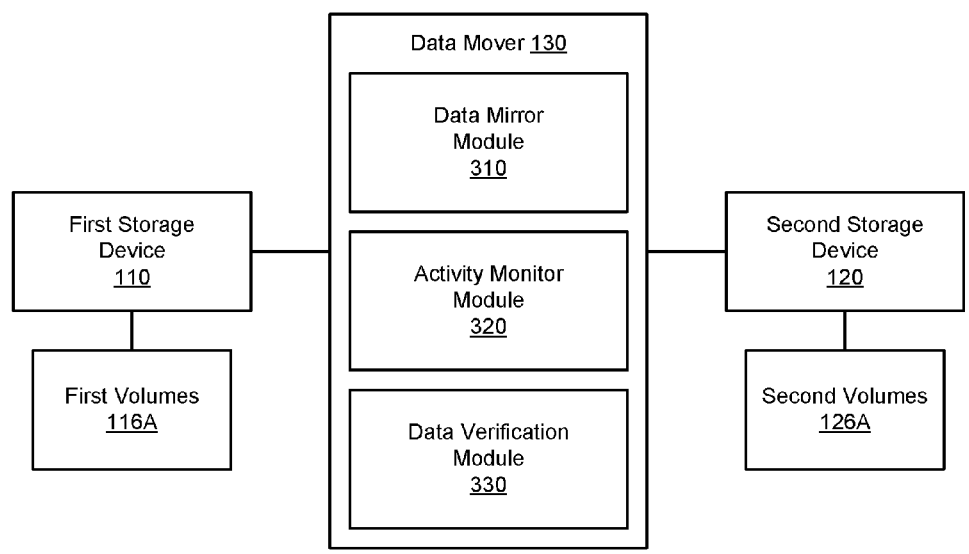
FIG. 3 is a schematic block diagram illustrating one embodiment of a data mover for mirroring track data associated with write activities.

FIG. 3 is a schematic block diagram 300 illustrating one embodiment of the data mover 130 for mirroring track data associated with write activities.

As shown in FIG. 3, the data mover 130 may include one or more modules including a data mirror module 310, an activity monitor module 320, and a data verification module 330. The data mirror module 310 (i.e., data mirror) may generate volume pairs of first and second volumes 116A, 126A by mirroring track data from the first volumes 116A stored by the first storage device 110 at a first site to the second volumes 126A as mirrored track data stored by the second storage device 120 at a second site that is different than the first site. The activity monitor module 320 (i.e., activity monitor) may monitor update activities for the volume pairs 116A, 126A and identify volume pairs having substantial residual counts of update activities as indicated by a pre-determined residual count threshold. The data verification module 330 (i.e., data verifier) may select one or more of the identified volume pairs 116A, 126A for evaluation, compare the track data in the first volume 116A to the mirrored track data in the second volume 126A. Further, if a match discrepancy is determined, then the data verification module 330 may re-copy the track data from the first volume 116A to the second volume 126A so as to correct and repair the mirrored track data in the second volume 126A. In some instances, volume pairs having substantial residual counts of update activities may represent volume pairs having a higher statistical chance of losing an update.

In accordance with the various implementations described herein, the data mover 130 may be configured for tasks and techniques related to data mirror high residual count extensive volume verification. In some cases, for every new volume pair identified with high residual counts, a new task may be created to extensively verify that the first or primary volume 116A has the same data and information as the second or auxiliary volume 126A at the track level. Note even though the same volume pair may be identified multiple times as exceeding the residual count threshold, the data mover 130 may ensure that there is only one active task at a time to perform extensive volume verification. This means that each task may represent the extensive volume verification of a unique volume pair that is processing individually and in parallel with other low priority tasks.

In some embodiments, the extensive volume verification routine may loop through the following algorithm for every track mirrored in the volume pair. For instance, the data mover 130 may read the track data from the first or primary volume 116A. Next, a command interface may be provided for the task of the data mover 130 to communicate directly with the first storage device 110. Note that this command processing may be done by the data mover's address space processing as a separate task in parallel with actual data movement. The data mover address space holds in-transit (or in-flight) records in a Time Group Buffer chain, that may include a header of the write activity and the write data. The data mover 130 may access the Time Group Buffer chain and journals associated with the volume pair to ensure that the track being analyzed is not in-flight. In-flight means that the data for the track is in the process of being copied by the data mover 130. The track may be checked in-flight via communication to the the data mover address space.

Next, if the track is in-flight, then the data mirror task may storage capture the in-flight track data. Otherwise, if the data mover 130 did not receive captured in-flight track data, then the data mover 130 may read the track data from the secondary volume 126A. Next, the data mover 130 may compare the first (or primary) track data to the second (or auxiliary) track data to determine whether they are the same. Next, if the primary and secondary track data are the same, then the task knows verification was successful. Further, in some cases, if this is not the last track, then the next track is selected to be processed by the algorithm. Otherwise, if this is the last track to analyze for the volume, then the data mover 130 may log that the verification for the volume was successful. In this instance, the log entry may include write pacing data identifying that the volume had a high residual count. The task completes, if this is the last track in the volume pair.

However, if the primary and secondary track data are not the same, then the task may log that the verification failed. In this instance, the log entry may have the failed track location CCHHR (cylinder, track, and record), a DSS PRINT of the primary volume's VTOC, a DSS PRINT TRACKS of the CCHH from both primary and secondary volumes, and any state save recorded hardware I/O activity specific to the track involved. In some cases, at this point, the data mover 130 may re-copy the track data to correct and repair the data discrepancy. If this is not the last track, then the next track is selected to be processed by the algorithm. The task completes, if this is the last track in the volume pair.

Figure 4:
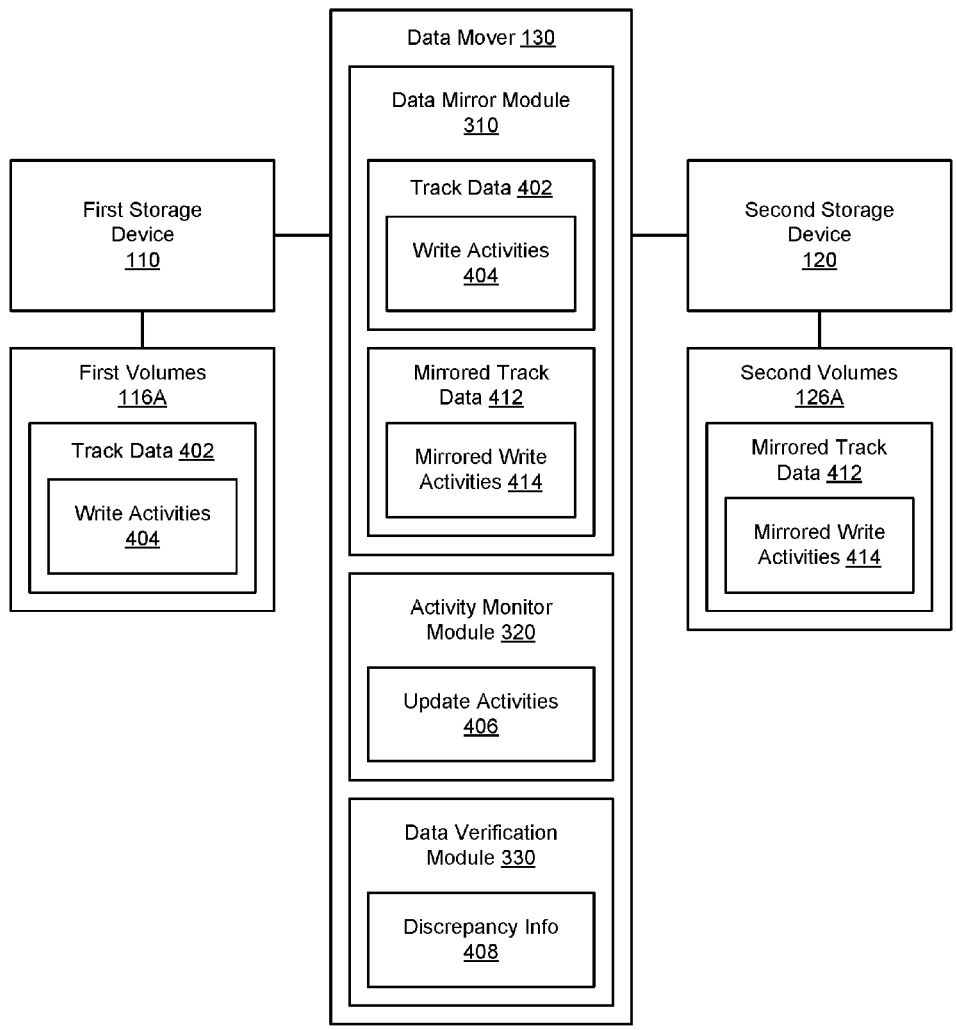
FIG. 4 is a schematic block diagram illustrating another embodiment of a data mover for mirroring track data associated with write activities.

FIG. 4 is a schematic block diagram 400 illustrating another embodiment of the data mover 130 for mirroring track data 402 associated with write activities 404.

As described herein, the data mover 130 may be referred to as a system data mover (SDM) that communicates with the first storage device 110 and the second storage device 120. The data mover 130 or (SDM) receives track data 402 associated with write activities 404 from the first storage device 110 at the first site and provides mirrored track data 412 associated with mirrored write activities 414 to the second storage device 120 at the second site. Further, the data mover 130 includes the data mirror module 310 for data replication over an extended distance between the first and second sites for continuity and disaster recovery of the track data associated with write activities 404.

As described herein, the data mirror module 310 generates volume pairs of first and second volumes 116A, 126A by mirroring track data 402 from the first volumes 116A stored by the first storage device 110 at a first site to the second volumes 126A as mirrored track data 412 stored by the second storage device 120 at a second site that is different than the first site. The track data 402 stored in the first volumes 116A is associated with write activities 404 generated by the first storage device 110. The mirrored track data 412 stored in the second volumes 126A is associated with mirrored write activities 4141 that are copied from the first storage device 110 to the second storage device 120.

The activity monitor module 320 monitors update activities 406 for the volume pairs 116A, 126A and identifies volume pairs having substantial residual counts of update activities 406 as indicated by a pre-determined residual count threshold. In some cases, the volume pairs 116A, 126A having substantial residual counts of update activities 406 may represent volume pairs having a higher statistical chance of losing an update. The activity monitor module 320 may monitor update activities 406 for the volume pairs 116A, 126A based on a pre-determined time interval.

In some cases, the activity monitor module 320 may read the track data 402 from the first volume 116A during mirroring and may further determine whether the track data 402 being mirrored from the first volume 116A is in-flight or in-transit from the first storage device 110 to the second storage device 120. If the track data 402 being mirrored is in-transit or in-flight, then the activity monitor module 320 may capture the track data 402 being mirrored while in-transit from the first storage device 110 to the second storage device 120. Further, if the mirrored track data 412 is not in-transit or in-flight, then the activity monitor module 320 may read the mirrored track data 414 from the second volume 126A that is stored in the second storage device 120 at the second site.

The data verification module 330 selects one or more of the identified volume pairs 116A, 126A for evaluation, compares the track data 402 in the first volume 116A to the mirrored track data 412 in the second volume 126A. If a match discrepancy is determined, then the data verification module 330 re-copies the track data 402 from the first volume 116A to the second volume 126A so as to correct and repair the mirrored track data 412 in the second volume 126A. In some cases, evaluation may include verification of the mirrored track data 412 stored by the second device 120 at the second site.

In some cases, the data verification module 330 may log match discrepancy information 408 associated with the track data 402 stored in the first volume 116A that does not match the mirrored track data 412 stored in the second volume 126A. Further, if a match discrepancy is found or determined, then the data verification module 330 may log the match discrepancy information 408 and re-copy the track data 402 from the first volume 116A to the second volume 126A so as to correct and repair the mirrored track data 12 in the second volume 126.

In some other cases, the data verification module 330 may perform one or more verification tasks by comparing the track data 402 from the first volume 116A to the mirrored track data 412 from the second volume 126A. If the track data 402 from the first volume 116A corresponds to the mirrored track data 412 from the second volume 126A, then the data verification module 330 may identify the one or more verification tasks as successful. Further, if the track data 402 from the first volume 116A fails to correspond to the mirrored track data 412 from the second volume 126A, then the data verification module 330 may identify the one or more verification tasks as unsuccessful, and the data verification module 330 may re-copy the track data 402 from the first volume 116A to the second volume 126A so as to correct and repair the mirrored track data 412 in the second volume 126A. These and other related tasks are described in greater detail herein.

Figure 5:
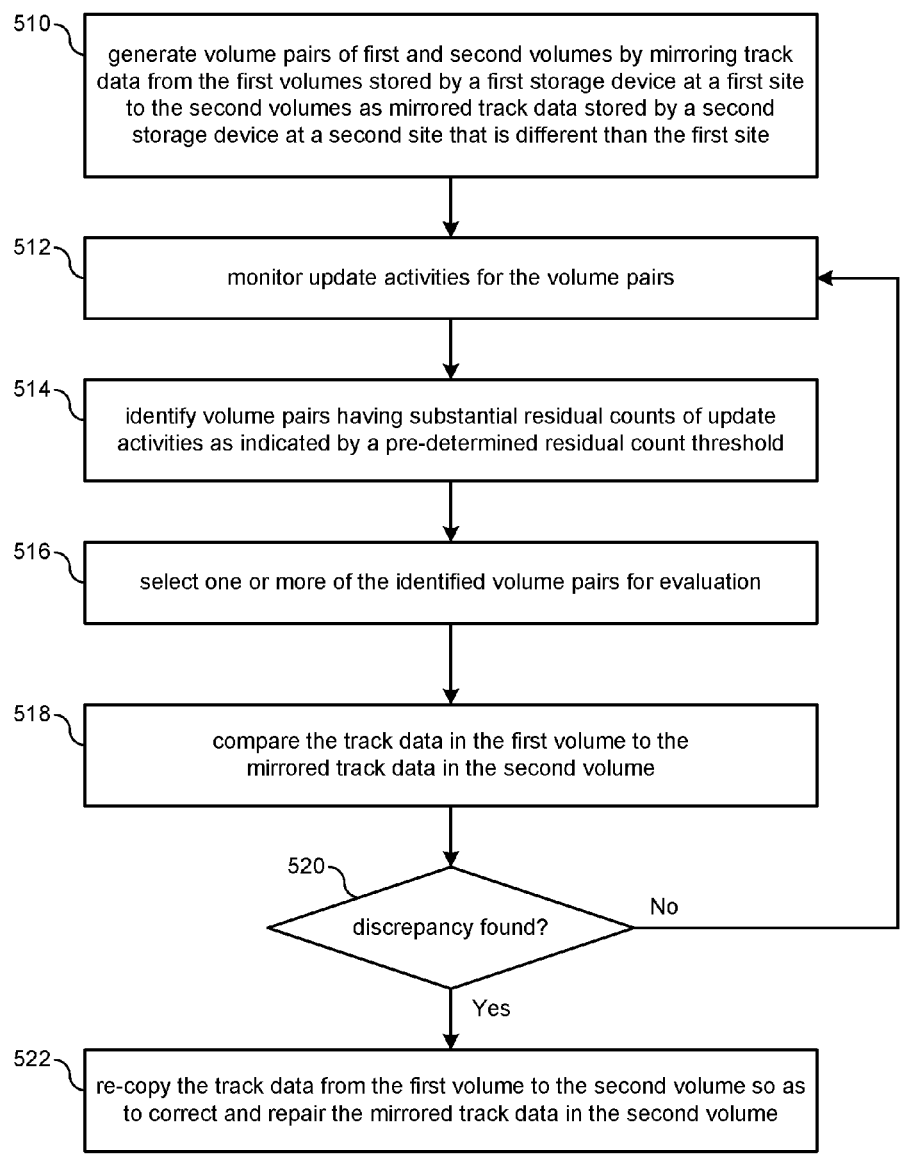
FIG. 5 is a diagram illustrating handling data mirror volume verification activities.

FIG. 5 is a schematic flow chart diagram illustrating one embodiment of a method 500 for handling data mirror volume verification activities.

In block 510, the method 500 may generate volume pairs of first and second volumes by mirroring track data from the first volumes stored by a first storage device at a first site to the second volumes as mirrored track data stored by a second storage device at a second site that is different than the first site. In block 512, the method 500 may monitor update activities for the volume pairs, and in block 514, the method 500 may identify volume pairs having substantial residual counts of update activities as indicated by a predetermined residual count threshold. In some cases, the volume pairs having substantial residual counts of update activities may represent volume pairs having a higher statistical chance of losing an update while in-transit or in-flight during mirroring.

In block 516, the method 500 selects one or more of the identified volume pairs for evaluation, and in block 518, the method 500 compares the track data in the first volume to the mirrored track data in the second volume. In some cases, evaluation may refer to verification of the mirrored track data stored by the second device at the second site by comparing the track data stored in the first volume to the mirrored track data stored in the second volume.

In block 520, the method 500 determines whether a match discrepancy is found. If a match discrepancy is determined, then in block 522, the method 500 re-copies the track data from the first volume to the second volume so as to correct and repair the mirrored track data in the second volume. Otherwise, if a match discrepancy is not found or determined, then the method 500 returns to block 512 to further monitor update activities for the volume pairs. In various cases, if a match discrepancy is not found or determined, then the method 500 may return to any block in the process flow.

In some embodiments, the method 500 may further include logging match discrepancy information associated with the track data in the first volume that does not match the mirrored track data in the second volume. For instance, if a match discrepancy is determined, then the method 500 may log the match discrepancy information.

Figure 6:
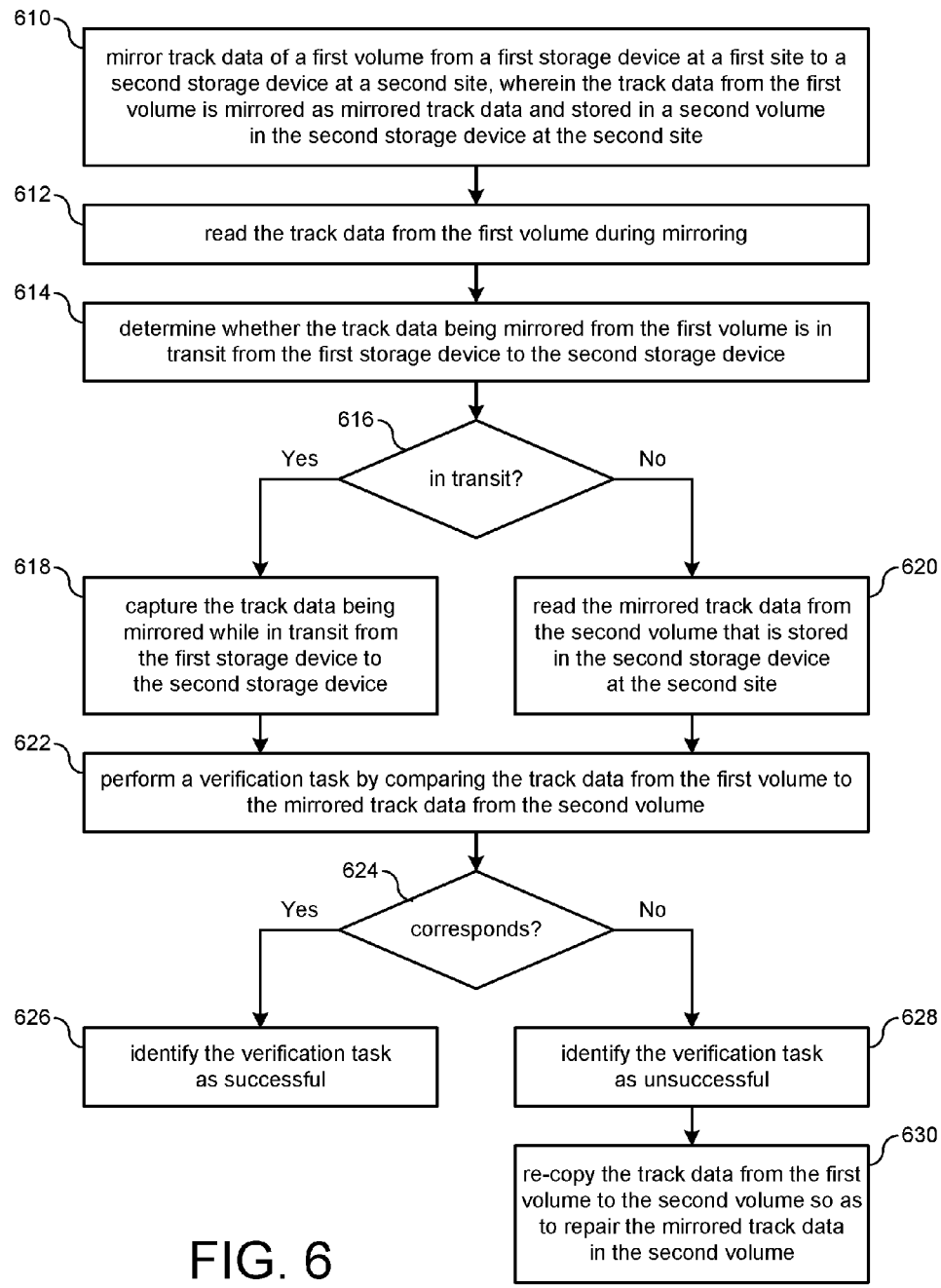
FIG. 6 is a schematic flow chart diagram illustrating one embodiment of a method for handling data mirror volume verification activities.

FIG. 6 is a schematic flow chart diagram illustrating one embodiment of a method 600 for handling data mirror volume verification activities.

In block 610, the method 600 mirrors track data of a first volume from a first storage device at a first site to a second storage device at a second site. The track data from the first volume is mirrored as mirrored track data and stored in a second volume in the second storage device at the second site.

In block 612, the method 600 reads the track data from the first volume during mirroring, and in block 614, the method 600 determines whether the track data being mirrored from the first volume is in-transit (or in-flight) from the first storage device to the second storage device. In block 616, the method 600 determines whether the first volume is in-transit (or in-flight). If the track data being mirrored is in-transit, then in block 618, the method 600 captures the track data being mirrored while in-transit from the first storage device to the second storage device. Otherwise, if the mirrored track data is not in-transit, then in block 620, the method 600 reads the mirrored track data from the second volume that is stored in the second storage device at the second site.

In some implementations, the method 600 may provide a new command interface for the task (or tasks) to communicate directly with the data mirror product (or with at least one of the modules or components of the data mover 130). Note that command processing may be done by the data mover's address space, which may include processing as a separate task in parallel with actual data movement. The data mover address space may hold "in-flight" records, e.g., in a Time Group Buffer chain, which may include a header of the write activity and/or the write data. The data mirror product may access the data mover's Time Group Buffer chain and journals associated with the volume pair to ensure the track being analyzed is not "in-flight". In some instances, "in-flight" means that the data for the track is in the process of being copied by the data mirror product. As such, the track may be checked "in-flight" via communication to the data mover address space, and if the track is determined to be "in-flight", then the data mirror task may storage capture the "in-flight" track data and return it to the method 600.

In block 622, the method 600 performs a verification task by comparing the track data from the first volume to the mirrored track data from the second volume. Then, in block 624, the method 600 determines whether the track data from the first volume corresponds to the mirrored track data from the second volume. If the track data from the first volume corresponds to the mirrored track data from the second volume, then in block 626, the method 600 identifies the verification task as successful. Otherwise, if the track data from the first volume fails to correspond to the mirrored track data from the second volume, then in block 628, the method 600 identifies the verification task as unsuccessful, and in block 630, the method 600 re-copies track data from the first volume to the second volume so as to correct and repair the mirrored track data in the second volume.

In some embodiments, the method 600 may further include logging match discrepancy information associated with the track data in the first volume that does not match the mirrored track data in the second volume. For instance, if a match discrepancy is determined, then the method 600 may log the match discrepancy information.

In some embodiments, a computer program product provides for mirroring data and information related to write activities from a primary storage device at a primary site to a secondary storage device at a secondary site, and the computer program product further provides for handling data mirror volume verification activities, as described herein in reference to FIGS. 1-6. In some implementations, the computer program product may include a computer readable storage medium having various program instructions that are readable/executable by a processor to cause the processor to perform embodiments of the methods 500, 600, as described above in reference to FIGS. 5, 6, respectively.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a data mirror module that generates a plurality of volume pairs of first and second volumes by mirroring track data from the first volumes stored by a first storage device at a first site to the second volumes as mirrored track data stored by a second storage device at a second site that is different than the first site;
   an activity monitor module that monitors update activities for the plurality of volume pairs, identifies volume pairs having substantial residual counts of update activities as indicated by a pre-determined residual count threshold, determines whether the track data being mirrored is in-transit, and if the track data being mirrored is in-transit, then the activity monitor module captures the track data being mirrored while in-transit; and
   a data verification module that selects a plurality of the identified volume pairs, wherein verification of a volume pair in the plurality of identified volume pairs is performed in parallel with verification of at least one other volume pair in the plurality of identified volume pairs, compares the track data in each of the first volumes to the mirrored track data in each of the second volumes of each identified volume pairs, and if a match discrepancy is determined, then re-copies the track data from each of the first volumes to each of the second volumes of each identified volume pairs so as to correct and repair the mirrored track data in the second volumes having the match discrepancy,
   wherein at least a portion of the modules comprise one or more of hardware circuits, programmable hardware devices, and executable code, the executable code stored on one or more computer readable storage media.

2. The apparatus of claim 1, wherein the track data stored in the first volumes is associated with write activities generated by the first storage device.

3. The apparatus of claim 1, wherein the mirrored track data stored in the second volumes is associated with mirrored write activities copied from the first storage device.

4. The apparatus of claim 1, wherein the volume pairs having substantial residual counts of update activities represent volume pairs having a higher statistical chance of losing an update.

5. The apparatus of claim 1, wherein evaluation comprises verification of the mirrored track data stored by the second device at the second site.

6. The apparatus of claim 1, wherein:
   the data verification module logs match discrepancy information associated with the track data stored in the first volume that does not match the mirrored track data stored in the second volume, and
   if a match discrepancy is determined, then the data verification module logs the match discrepancy information and re-copies the track data from the first volume to the second volume so as to correct and repair the mirrored track data in the second volume.

7. The apparatus of claim 1, wherein the activity monitor module monitors update activities for the volume pairs based on a pre-determined time interval.

8. The apparatus of claim 1, wherein the apparatus comprises a system data mover that communicates with the first storage device and the second storage device.

9. The apparatus of claim 8, wherein the system data mover receives the track data associated with write activities from the first storage device at the first site and provides mirrored track data associated with mirrored write activities to the second storage device at the second site.

10. The apparatus of claim 8, wherein the system data mover records the mirrored write activities in a consistency group in sequence by order based on a timestamp of each mirrored write activity.

11. The apparatus of claim 1, wherein the first site and the second site are separated by an extended distance, and wherein the data mirror module provides for data replication over the extended distance between the first and second sites for continuity and disaster recovery of the track data associated with write activities.

12. An apparatus, comprising:
   a data mirror module that generates a plurality of volume pairs of first and second volumes by mirroring track data of a plurality of first volumes from a first storage device at a first site to a second storage device at a second site, wherein the track data from the plurality of first volumes is mirrored as mirrored track data and stored in a plurality of second volumes in the second storage device at the second site;
   an activity monitor module that reads the track data from each of the first volumes during mirroring and determines whether the track data being mirrored from each of the first volumes is in-transit from the first storage device to the second storage device, wherein:
      if the track data being mirrored is in-transit, then the activity monitor module captures the track data being mirrored while in-transit from the first storage device to the second storage device, and
      if the mirrored track data is not in-transit, then the activity monitor module reads the mirrored track data from the second volume that is stored in the second storage device at the second site; and
   a data verification module that performs a verification task of the plurality of volume pairs, wherein verification of a volume pair in the plurality of identified volume pairs is performed in parallel with verification of at least one other volume pair in the plurality of identified volume pairs, the verification task performed by comparing the track data from each of the first volumes in volume pairs to the mirrored track data from each of the second volumes in volume pairs, wherein:
      if the track data from each of the first volumes corresponds to the mirrored track data from each of the second volumes, then the data verification module identifies the verification task as successful, and
      if the track data from each of the first volumes fails to correspond to the mirrored track data from each of the second volumes, then the data verification module identifies the verification task as unsuccessful and re-copies the track data from each of the first volumes to each of the second volumes so as to repair the mirrored track data in each of the second volumes, wherein at least a portion of the modules comprise one or more of hardware circuits, programmable hardware devices, and executable code, the executable code stored on one or more computer readable storage media.

13. The apparatus of claim 12, wherein the track data stored in the first volume is associated with write activities generated by the first storage device, and wherein the mirrored track data stored in the second volume is associated with mirrored write activities copied from the first storage device.

14. The apparatus of claim 12, wherein:
the data verification module logs match discrepancy information associated with the track data in the first volume that does not match the mirrored track data in the second volume, and
if a match discrepancy is determined, then the data verification module logs the match discrepancy information and re-copies the track data from the first volume to the second volume so as to repair the mirrored track data in the second volume.

15. The apparatus of claim 12, wherein the apparatus comprises a system data mover that communicates with the first storage device and the second storage device.

16. The apparatus of claim 15, wherein the system data mover receives the track data associated with write activities from the first storage device at the first site and provides the mirrored track data associated with mirrored write activities to the second storage device at the second site.

17. The apparatus of claim 15, wherein the system data mover records the mirrored write activities in a consistency group in sequence by order based on a timestamp of each mirrored write activity.

18. The apparatus of claim 12, wherein the first site and the second site are separated by an extended distance, and wherein the data mirror module provides for data replication over the extended distance between the first and second sites for continuity and disaster recovery of the track data associated with write activities.

19. A method, comprising:
generating volume pairs of first and second volumes by mirroring track data from a plurality of first volumes stored by a first storage device at a first site to a plurality of second volumes as mirrored track data stored by a second storage device at a second site that is different than the first site;
monitoring update activities for the volume pairs;
identifying volume pairs having substantial residual counts of update activities as indicated by a predetermined residual count threshold;
determining whether the track data being mirrored is in-transit, and if the track data being mirrored is in-transit, then capturing the track data being mirrored while in-transit;
selecting one or more of the identified volume pairs for evaluation, wherein the evaluation of a volume pair in the identified volume pairs is performed in parallel with the evaluation of at least one other volume pair in the plurality of identified volume pairs;
comparing the track data in each of the first volumes in volume pairs to the mirrored track data in each of the second volumes in volume pairs; and
if a match discrepancy is determined, then re-copying the track data from each of the first volumes in volume pairs to each of the second volumes in volume pairs so as to correct and repair the mirrored track data in each of the second volumes in volume pairs.

20. The method of claim 19, further comprising:
logging match discrepancy information associated with the track data in the first volume that does not match the mirrored track data in the second volume, and
if a match discrepancy is determined, logging the match discrepancy information and re-copying the track data from the first volume to the second volume so as to correct and repair the mirrored track data in the second volume.

* * * * *